(12) United States Patent
Hashimoto et al.

(10) Patent No.: US 11,837,904 B2
(45) Date of Patent: Dec. 5, 2023

(54) CHARGER

(71) Applicant: TOYOTA JIDOSHA KABUSHIKI KAISHA, Toyota-shi (JP)

(72) Inventors: Hironobu Hashimoto, Toyota-shi (JP); Kenji Murasato, Toyota-shi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 101 days.

(21) Appl. No.: 17/556,317

(22) Filed: Dec. 20, 2021

(65) Prior Publication Data

US 2022/0209564 A1 Jun. 30, 2022

(30) Foreign Application Priority Data

Dec. 28, 2020 (JP) .................. 2020-218614

(51) Int. Cl.
*H02J 7/00* (2006.01)
*H02J 7/02* (2016.01)
*B60L 53/16* (2019.01)

(52) U.S. Cl.
CPC .......... *H02J 7/00712* (2020.01); *B60L 53/16* (2019.02); *H02J 7/0042* (2013.01); *H02J 7/02* (2013.01); *B60L 2210/00* (2013.01)

(58) Field of Classification Search
CPC .. H02J 7/00712; H02J 7/0042; B60L 2210/00
USPC ................................................... 320/109
See application file for complete search history.

(56) References Cited

U.S. PATENT DOCUMENTS

| | | | |
|---|---|---|---|
| 2014/0035527 A1* | 2/2014 | Hayashigawa | B60L 3/04 320/109 |
| 2020/0139831 A1 | 5/2020 | Ichikawa | |
| 2022/0032794 A1* | 2/2022 | Lee | H01R 24/28 |
| 2022/0072967 A1* | 3/2022 | Mackenzie | H01R 31/02 |
| 2022/0247191 A1* | 8/2022 | Niwa | H02J 7/0042 |

FOREIGN PATENT DOCUMENTS

| | | |
|---|---|---|
| CN | 109729715 A | 5/2019 |
| JP | 2020-068618 A | 4/2020 |
| JP | 2020-078153 A | 5/2020 |

* cited by examiner

*Primary Examiner* — Suchin Parihar
(74) *Attorney, Agent, or Firm* — Dinsmore & Shohl LLP

(57) ABSTRACT

A casing of a charger includes a DC port and a plurality of AC ports. The charger includes a switching device configured to connect one of the AC ports selectively to a power conversion circuit. The power conversion circuit is configured to convert, into direct current electric power, alternating current electric power input from the AC port connected by the switching device, and output the direct current electric power to the DC port.

8 Claims, 11 Drawing Sheets

CHARGER

CROSS-REFERENCE TO RELATED APPLICATION

This application claims priority to Japanese Patent Application No. 2020-218614 filed on Dec. 28, 2020, incorporated herein by reference in its entirety.

BACKGROUND

1. Technical Field

The present disclosure relates to a charger configured to charge a power storage device, and more particularly, to a charger configured to receive alternating current (AC) power and output direct current (DC) power.

2. Description of Related Art

For example, Japanese Unexamined Patent Application Publication No. 2020-078153 (JP 2020-078153 A) discloses a charger configured to receive alternating current electric power (AC power) and output direct current electric power (DC power). A casing of the charger described in JP 2020-078153 A includes a DC connector connectable to a DC inlet (DC power inlet) of a vehicle, and an AC inlet (AC power inlet) connectable to an AC connector (connector of an AC power cable). A power conversion circuit for AC/DC conversion (conversion from AC to DC) is provided in the casing of the charger.

SUMMARY

For example, the charger described in JP 2020-078153 A is used for charging a power storage device of the vehicle. As electric vehicle supply equipment (EVSE) configured to supply alternating current electric power (AC power), EVSE in Mode 2 and EVSE in Mode 3 are widely available.

The EVSE in Mode 2 includes an AC socket (AC power socket). An outlet cable for Mode 2 is used for connecting a vehicle having an AC inlet to the EVSE in Mode 2. The outlet cable for Mode 2 includes an AC plug connectable to the AC socket, an AC connector connectable to the AC inlet of the vehicle, and a control box including a control circuit. The control circuit in the control box generates a control pilot signal (CPLT signal).

The EVSE in Mode 3 has an outlet cable (more specifically, an AC power cable). The outlet cable has an AC connector at the distal end. To connect a vehicle having an AC inlet to the EVSE in Mode 3, the AC connector of the EVSE is connected to the AC inlet of the vehicle. The EVSE in Mode 3 includes a control circuit. The control circuit generates a CPLT signal.

By using the charger described in JP 2020-078153 A and the outlet cable for Mode 2, a vehicle having a DC inlet can be connected to the EVSE in Mode 2, and a power storage device of the vehicle can be charged with AC power supplied from the EVSE. More specifically, the EVSE in Mode 2 and the vehicle are electrically connected by connecting the AC plug of the outlet cable to the AC socket of the EVSE, the AC connector of the outlet cable to the AC inlet of the charger, and the DC connector of the charger to the DC inlet of the vehicle. The AC power supplied from the EVSE is converted into direct current electric power (DC power) by the power conversion circuit of the charger. The DC power is output from the DC connector of the charger to the vehicle.

When connecting the vehicle having the DC inlet to the EVSE in Mode 3 by using the charger described in JP 2020-078153 A, the EVSE in Mode 3 and the vehicle are electrically connected by connecting the AC connector of the EVSE to the AC inlet of the charger and the DC connector of the charger to the DC inlet of the vehicle.

The charger described in JP 2020-078153 A is not adaptable solely to the EVSE in Mode 2. When connecting the vehicle to the EVSE in Mode 2 by using the charger, the charger needs to be used in combination with the outlet cable for Mode 2. Therefore, the charger described in JP 2020-078153 A is not highly convenient to a user.

The present disclosure has been made to solve the problem described above, and has an object to provide a charger configured to receive AC power supplied both from an AC socket and from an AC connector, convert the supplied AC power into DC power, and output the DC power to a DC connector.

A charger according to one aspect of the present disclosure includes a casing, a power conversion circuit being provided in the casing, and a switching device being provided in the casing and configured to connect one of the AC ports selectively to the power conversion circuit. The casing includes a DC port through which DC power is outputtable to a DC connector configured to electrically connect the charger to a power storage device, and a plurality of AC ports configured to be ports to which AC power for charging the power storage device is input. The switching device is configured to connect one of the AC ports selectively to the power conversion circuit. The power conversion circuit is configured to convert, into DC power, AC power input from the AC port connected by the switching device, and output the DC power to the DC port. The AC ports include a first AC port configured to be a port to which alternating current electric power received at an AC plug connectable to an AC power socket (AC socket) is input, and a second AC port configured to be a port to which alternating current electric power received at an AC inlet connectable to a connector of an AC power cable (AC connector) is input.

In the charger described above, the switching device can connect one of the AC ports selectively to the power conversion circuit. The AC ports include at least the first AC port and the second AC port. When the first AC port is connected to the power conversion circuit, the power conversion circuit converts the AC power received at the AC plug into the direct current electric power (DC power). The AC plug is connectable to the AC socket. When the second AC port is connected to the power conversion circuit, the power conversion circuit converts the AC power received at the AC inlet into the DC power. The AC inlet is connectable to the AC connector. The DC power generated by the power conversion circuit is output to the DC connector. Thus, the charger can receive the AC power supplied both from the AC socket and from the AC connector, convert the supplied AC power into the DC power, and output the DC power to the DC connector.

In the aspect described above, the power conversion circuit may be connected to a first power line and a second power line. The second power line may be connected to the DC port. The first power line may branch, inside the casing, into a third power line connected to the first AC port and a fourth power line connected to the second AC port. The switching device may include a relay configured to selectively connect the third power line or the fourth power line to the power conversion circuit.

The relay can connect one of the third power line and the fourth power line branched in the charger to the power conversion circuit, and disconnect the other from the power conversion circuit. According to the structure described above, the number of relays can be reduced as compared to a structure in which relays are provided individually to the third power line and the fourth power line.

In the aspect described above, the second power line may be connected to the DC connector outside the casing from the power conversion circuit in the casing through the DC port. The third power line may be connected to the AC plug outside the casing from the relay in the casing through the first AC port. The fourth power line may be connected to the AC inlet outside the casing from the relay in the casing through the second AC port.

In the aspect described above, the DC port may be a connector configured to removably attach the DC connector to the charger. The second AC port may be a connector configured to removably attach the AC inlet to the charger.

In the charger described above, the DC connector and the AC inlet are removably attached by the respective connectors (DC port and second AC port), thereby facilitating replacement of the DC connector and the AC inlet.

In the aspect described above, the DC connector may be connected to a DC power inlet (DC inlet) of a vehicle including the power storage device. The AC power socket (AC socket) may be a socket of first electric vehicle supply equipment. The AC power cable (AC cable) may be a cable of second electric vehicle supply equipment. The charger may be a portable charger loadable onto and unloadable from the vehicle.

Even if the vehicle does not have an AC charger, a user of the vehicle uses the portable charger to charge the power storage device of the vehicle by EVSE configured to supply AC power (for example, EVSE in Mode 2 or 3). The portable charger can be mounted on the vehicle as necessary. When the charging is not executed along with AC/DC conversion, the portable charger need not be mounted on the vehicle. Thus, the weight of the vehicle can be reduced.

In the aspect described above, the charger may further include a control device. The control device may be provided in the casing, and configured to control the switching device. The control device may be configured to connect the first AC port to the power conversion circuit and disconnect the second AC port from the power conversion circuit when AC power is input from the AC plug to the first AC port. The control device may be configured to connect the second AC port to the power conversion circuit and disconnect the first AC port from the power conversion circuit when AC power is input from the AC inlet to the second AC port.

Since the charger includes the control device described above, the switching device can appropriately switch connection (first AC port or second AC port) depending on the AC port (first AC port or second AC port) to which the AC power is input.

In the aspect described above, the charger may further include a sensor. The sensor may be provided in the casing, and configured to detect AC power input from the AC plug to the first AC port. The control device may be configured to, in a first state in which the first AC port is connected to the power conversion circuit and the second AC port is disconnected from the power conversion circuit, start charging the power storage device in the first state when the sensor detects alternating current electric power input from the AC plug to the first AC port and the charger is electrically connected to the power storage device through the DC connector. The control device may be configured to, when a predetermined signal is received from the AC inlet through the second AC port in the first state, control the switching device to switch over to a second state in which the second AC port is connected to the power conversion circuit and the first AC port is disconnected from the power conversion circuit, and start charging the power storage device in the second state when the charger is electrically connected to the power storage device through the DC connector.

In the structure described above, when the AC power is input from the AC plug to the first AC port, the charging of the power storage device is started in the first state. When the control device receives the predetermined signal from the AC inlet before the AC power is input from the AC plug to the first AC port, the charging of the power storage device is started in the second state. When the control device receives the predetermined signal from the AC inlet, the AC power may be input from the AC inlet to the second AC port. According to the structure described above, the charging of the power storage device is started in an appropriate state depending on the AC port (first AC port or second AC port) to which the AC power is input.

In the aspect described above, the predetermined signal may be a control pilot signal. The control pilot signal (CPLT signal) is transmitted from the AC inlet to the control device to notify the control device that the AC connector is connected to the AC inlet. Based on the control pilot signal, the control device can accurately determine whether the AC power is input from the AC inlet to the second AC port.

According to the present disclosure, it is possible to provide the charger configured to receive AC power supplied both from the AC socket and from the AC connector, convert the supplied AC power into DC power, and output the DC power to the DC connector.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
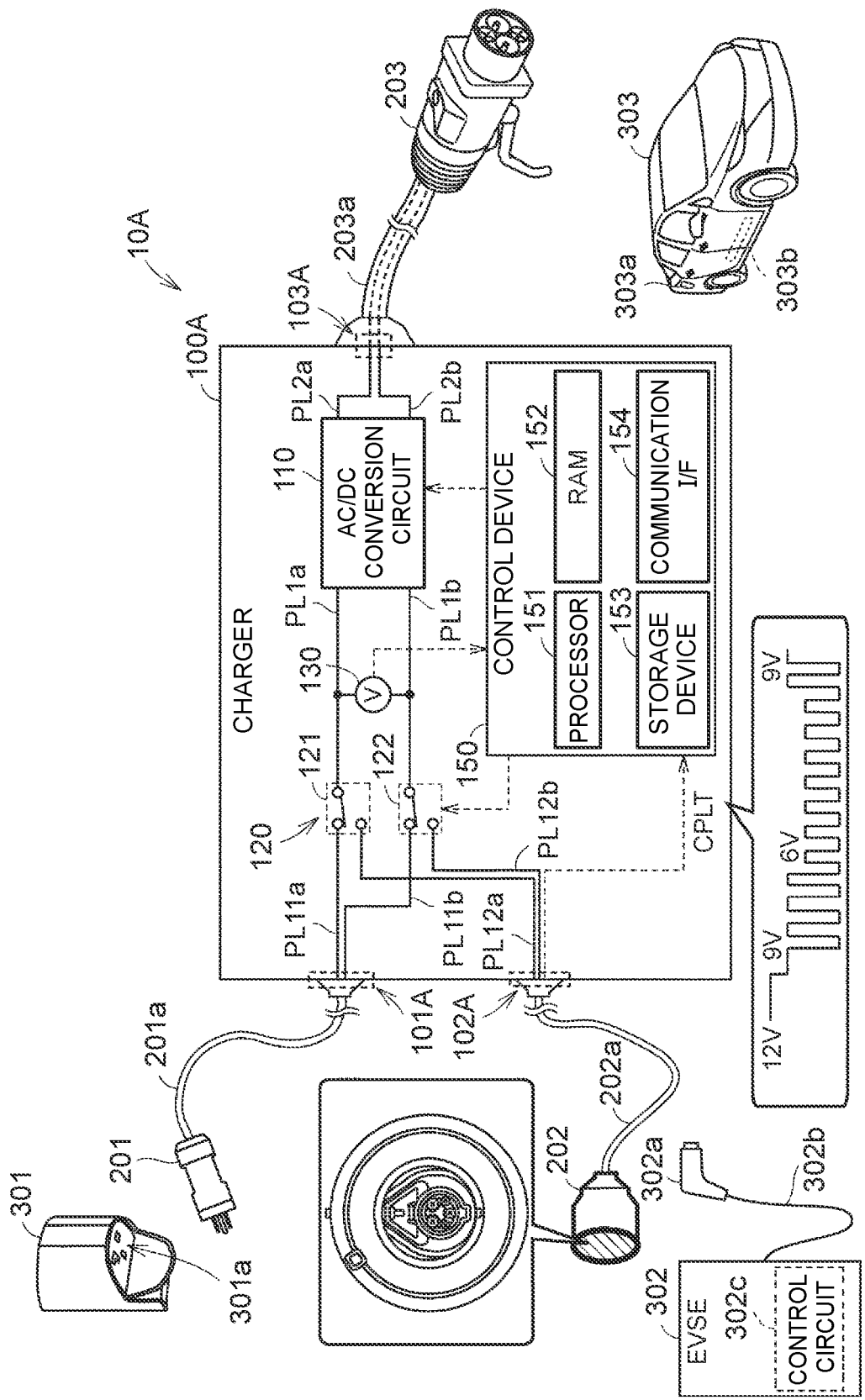
FIG. 1 is a diagram illustrating the structure of a charger according to an embodiment of the present disclosure.

An embodiment of the present disclosure is described in detail with reference to the drawings. In the drawings, the same or corresponding parts are represented by the same reference symbols to omit redundant description.

FIG. 1 is a diagram illustrating the structure of a charger 10A according to this embodiment. Although FIG. 1 illustrates the charger 10A in enlarged view, the charger 10A is a portable charger loadable onto and unloadable from a vehicle 303.

Referring to FIG. 1, the charger 10A includes a casing 100A. The charger 10A includes an AC/DC conversion circuit 110, a switching device 120, a voltmeter 130, and a control device 150 in the casing 100A. The charger 10A includes an AC plug 201, an AC inlet 202, and a DC connector 203 outside the casing 100A. The casing 100A includes a first AC port 101A, a second AC port 102A, and a DC port 103A. Alternating current electric power (AC power) received at the AC plug 201 is input to the first AC port 101A. AC power received at the AC inlet 202 is input to the second AC port 102A. Direct current electric power (DC power) is output to the DC connector 203 through the DC port 103A. The AC plug 201 and the first AC port 101A are connected via a cable 201a. The AC inlet 202 and the second AC port 102A are connected via a cable 202a. The DC connector 203 and the DC port 103A are connected via a cable 203a. The control device 150 controls the switching device 120.

The vehicle 303 includes a DC inlet (DC power inlet) 303a and a power storage device 303b. Examples of the vehicle 303 include an electric vehicle configured to travel by using electric power stored in the power storage device 303b. Examples of the power storage device 303b include a secondary battery configured to supply electric power to a traveling motor (not illustrated) of the vehicle 303. The power storage device 303b may be a battery pack including a plurality of lithium ion secondary batteries. The DC connector 203 is used for electrically connecting the charger 10A to the power storage device 303b. The DC connector 203 is connectable to the DC inlet 303a of the vehicle 303.

Electric vehicle supply equipment (EVSE) 301 and EVSE 302 supply AC power for charging the power storage device 303b. The EVSE 301 is EVSE in Mode 2, and includes an AC socket (AC power socket) 301a. The EVSE 302 is EVSE in Mode 3. The EVSE 302 has an AC cable (AC power cable) 302b. The AC cable 302b has an AC connector 302a at the distal end. The EVSE 302 includes a control circuit 302c. The control circuit 302c generates a control pilot signal (CPLT signal). The AC plug 201 is connectable to the AC socket 301a of the EVSE 301. The AC inlet 202 is connectable to the AC connector 302a of the AC cable 302b of the EVSE 302. In this embodiment, the EVSE 301 and the EVSE 302 correspond to examples of "first electric vehicle supply equipment" and "second electric vehicle supply equipment" according to the present disclosure, respectively.

The switching device 120 in the casing 100A of the charger 10A connects the first AC port 101A or the second AC port 102A selectively to the AC/DC conversion circuit 110. The switching device 120 includes C-contact relays 121 and 122. The C-contact relays 121 and 122 are controlled by the control device 150. The AC/DC conversion circuit 110 converts, into DC power, AC power input from the AC port (first AC port 101A or second AC port 102A) connected by the switching device 120, and outputs the DC power to the DC port 103A. The AC/DC conversion circuit 110 according to this embodiment corresponds to an example of "power conversion circuit" according to the present disclosure. A circuit structure in the casing 100A is described below in detail.

A power line PL1a at a first polarity and a power line PL1b at a second polarity are connected to a first end of the AC/DC conversion circuit 110. The first polarity and the second polarity described here may be, for example, "hot" and "earth (ground)". A power line PL2a at the first polarity and a power line PL2b at the second polarity are connected to a second end of the AC/DC conversion circuit 110. The power lines PL2a and PL2b are connected to the DC port 103A. The first polarity and the second polarity described here may be, for example, "positive" and "negative". The power line PL1a and the power line PL2a correspond to examples of "first power line" and "second power line" according to the present disclosure, respectively.

During charging, AC power is input to the first end of the AC/DC conversion circuit 110, and DC power is output from the second end of the AC/DC conversion circuit 110. The first polarity is opposite to the second polarity. The voltmeter 130 detects a voltage between the power line PL1a and the power line PL1b. The voltage between the power line PL1a and the power line PL1b corresponds to an input voltage of the AC/DC conversion circuit 110. The voltmeter 130 corresponds to an example of "sensor" according to the present disclosure.

The power line PL1a branches into a power line PL11a and a power line PL12a at a first branch point. The C-contact relay 121 is arranged at the first branch point. The power line PL1b branches into a power line PL11b and a power line PL12b at a second branch point. The C-contact relay 122 is arranged at the second branch point. The power lines PL11a and PL11b are connected to the first AC port 101A. The power lines PL12a and PL12b are connected to the second AC port 102A. The power line PL11a and the power line PL12a correspond to examples of "third power line" and "fourth power line" according to the present disclosure, respectively.

The C-contact relays 121 and 122 operate as a set in pairs. The C-contact relay 121 connects, at the first branch point, the power line PL11a (first AC port 101A side) or the power line PL12a (second AC port 102A side) selectively to the power line PL1a (furthermore, the AC/DC conversion circuit 110). The C-contact relay 122 connects, at the second branch point, the power line PL11b (first AC port 101A side) or the power line PL12b (second AC port 102A side) selectively to the power line PL1b (furthermore, the AC/DC conversion circuit 110). The connection of the power lines PL11a and PL11b to the power lines PL1a and PL1b by the C-contact relays 121 and 122, respectively, is hereinafter referred to also as "AC plug connection". The connection of the power lines PL12a and PL12b to the power lines PL1a and PL1b by the C-contact relays 121 and 122, respectively, is hereinafter referred to also as "AC inlet connection".

The C-contact relays 121 and 122 are controlled by the control device 150. While no instruction is given from the control device 150 (for example, in a non-energized state), the C-contact relays 121 and 122 are in the AC plug connection state. Each of the C-contact relays 121 and 122 may be an electromagnetic mechanical relay. The C-contact relays 121 and 122 according to this embodiment correspond to examples of "relay".

The first AC port 101A, the second AC port 102A, and the DC port 103A have wiring holes. The power lines PL11a and PL11b are connected to the AC plug 201 outside the casing 100A from the C-contact relays 121 and 122 in the casing 100A through the first AC port 101A (wiring hole) and the cable 201a, respectively. The power lines PL12a and PL12b are connected to the AC inlet 202 outside the casing 100A from the C-contact relays 121 and 122 in the casing 100A through the second AC port 102A (wiring hole) and the cable 202a, respectively. A signal line for the CPLT signal also passes through the second AC port 102A (wiring hole). The power lines PL2a and PL2b are connected to the DC connector 203 outside the casing 100A from the AC/DC conversion circuit 110 in the casing 100A through the DC port 103A (wiring hole) and the cable 203a. A signal line (not illustrated) between the control device 150 and the vehicle 303 also passes through the DC port 103A (wiring hole).

Figure 2:
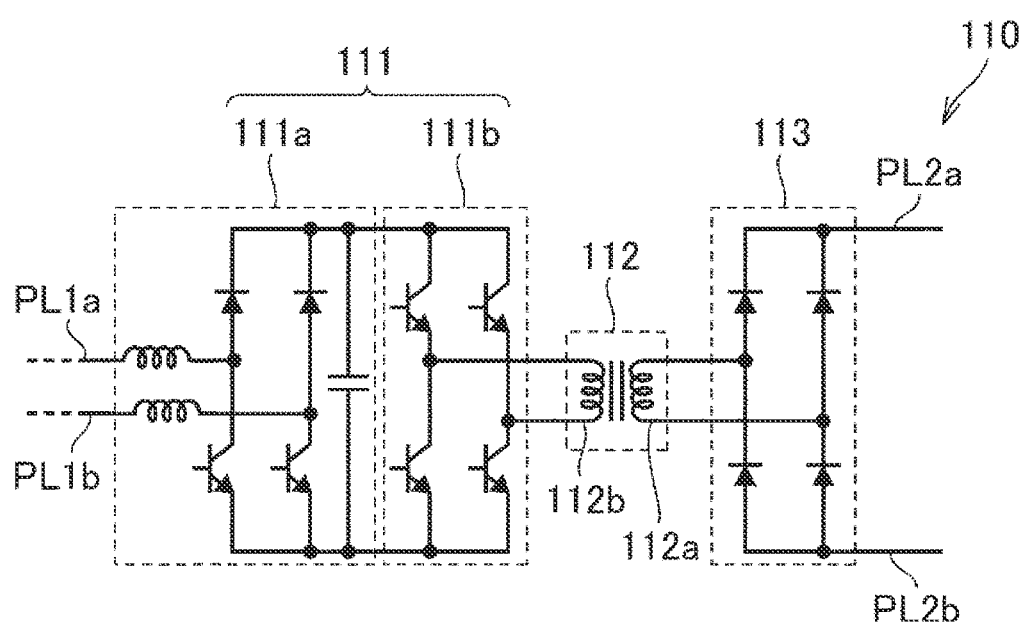
FIG. 2 is a diagram illustrating an example of the circuit structure of an AC/DC conversion circuit illustrated in FIG. 1.

FIG. 2 is a diagram illustrating an example of the circuit structure of the AC/DC conversion circuit 110. Referring to FIG. 2 together with FIG. 1, the AC/DC conversion circuit 110 includes a power factor correction (PFC) circuit 111, an isolation circuit 112, and a rectifying circuit 113.

The PFC circuit 111 includes a rectifying circuit 111a and an inverter 111b. The rectifying circuit 111a rectifies and steps up input AC power. More specifically, the rectifying circuit 111a includes two sets of upper and lower arms, two reactors, and one smoothing capacitor. In each set of the upper and lower arms, the upper arm includes a diode, and the lower arm includes a switching element. The switching element of the lower arm is controlled by the control device 150. Through the control of the control device 150 on each switching element in the rectifying circuit 111a, the rectifying circuit 111a functions as a step-up chopper circuit.

The inverter 111b is a full-bridge circuit including four switching elements. Each switching element is controlled by the control device 150. Through the control of the control device 150 on each switching element in the inverter 111b, DC power input from the rectifying circuit 111a to the inverter 111b is converted into high-frequency AC power.

The isolation circuit 112 is an isolation transformer including coils 112a and 112b. The rectifying circuit 113 is connected to the coil 112a via an electric wire. The PFC circuit 111 is connected to the coil 112b via an electric wire. The coil 112a and the coil 112b are electrically isolated from each other. The isolation circuit 112 steps up an AC voltage applied to the coil 112b, and outputs the AC voltage to the coil 112a.

The rectifying circuit 113 is a diode bridge circuit including four diodes. The rectifying circuit 113 converts AC power supplied from the coil 112a of the isolation circuit 112 into DC power.

With the structure described above, the AC/DC conversion circuit 110 performs, during charging, AC/DC conversion (conversion from AC to DC) on AC power input from the AC plug 201 or the AC inlet 202 (see FIG. 1) to the power lines PL1a and PL1b, and outputs DC power to the power lines PL2a and PL2b. More specifically, the rectifying circuit 111a rectifies and steps up the AC power input to the power lines PL1a and PL1b, and outputs DC power to the inverter 111b. The inverter 111b converts the DC power received from the rectifying circuit 111a into high-frequency AC power. The isolation circuit 112 transmits the output (AC power) of the inverter 111b to the rectifying circuit 113. The rectifying circuit 113 rectifies the AC power received from the isolation circuit 112, and outputs DC power to the power lines PL2a and PL2b.

The structure of the AC/DC conversion circuit 110 is not limited to the structure illustrated in FIG. 2. For example, the AC/DC conversion circuit 110 may be a rectifying circuit that does not include the isolation circuit. To acquire information to be used for control by the control device 150, various sensors (for example, a current sensor and a voltage sensor) may be provided at appropriate positions in the circuit illustrated in FIG. 2.

Referring back to FIG. 1, the control device 150 includes a processor 151, a random access memory (RAM) 152, a storage device 153, and a communication interface (I/F) 154. The processor 151 may be a central processing unit (CPU). The RAM 152 functions as a working memory configured to temporarily store data to be processed by the processor 151. The storage device 153 can save stored information. For example, the storage device 153 includes a read only memory (ROM) and a rewritable non-volatile memory. The communication I/F 154 includes various communication I/Fs for allowing the control device 150 to communicate with the EVSE 302 and the vehicle 303. The storage device 153 stores programs and information for use in the programs (for example, maps, mathematical expressions, and various parameters). In this embodiment, the processor 151 executes the programs stored in the storage device 153 to execute various types of control of the control device 150.

Although illustration is omitted in FIG. 1, a power supply circuit of the control device 150 is provided in the casing 100A. The power supply circuit of the control device 150 generates drive electric power of the control device 150 (that is, electric power for operating the control device 150) by using electric power supplied from a predetermined power supply, and supplies the generated drive electric power to the control device 150. The power supply circuit of the control device 150 may generate the drive electric power of the control device 150 by using electric power of a battery (not illustrated) in the casing 100A. The power supply circuit of the control device 150 may generate the drive electric power of the control device 150 by using AC power supplied to the first AC port 101A or the second AC port 102A. The power supply circuit of the control device 150 may be connected to the power lines PL11a, PL11b, PL12a, and PL12b.

Figure 3:
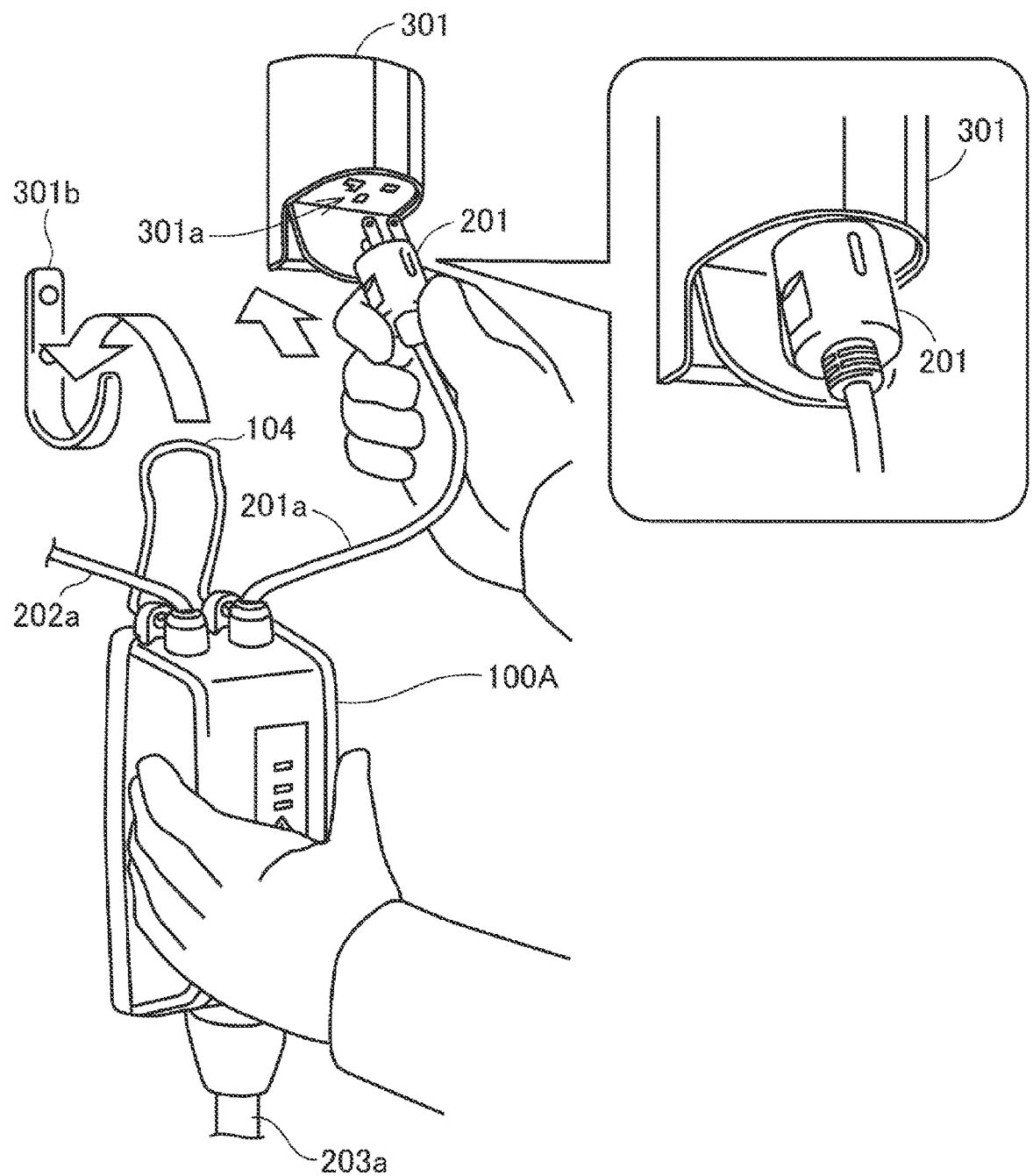
FIG. 3 is a diagram illustrating an example of the appearance of a casing illustrated in FIG. 1.

The casing 100A of the charger 10A may be hung on a wall. FIG. 3 is a diagram illustrating an example of the appearance of the casing 100A. Referring to FIG. 3, the casing 100A in this example includes a hanger 104 (for example, a U-shaped wire). The casing 100A can be hung on the wall by putting the hanger 104 on a catch 301b (for example, a hook) fixed to the wall. When the AC plug 201 of the charger 10A is inserted into the AC socket 301a of the EVSE 301 with the casing 100A hung on the wall, the AC plug 201 is connected to the AC socket 301a. Thus, excessive loads on the AC plug 201 and the cable 201a can be reduced during charging.

Referring back to FIG. 1, when the AC plug 201 of the charger 10A according to this embodiment is connected to the AC socket 301a of the EVSE 301, the switching device 120 connects the first AC port 101A to the AC/DC conversion circuit 110, and the AC/DC conversion circuit 110 converts AC power received at the AC plug 201 into DC power. When the AC connector 302a of the EVSE 302 is connected to the AC inlet 202, the switching device 120 connects the second AC port 102A to the AC/DC conversion circuit 110, and the AC/DC conversion circuit 110 converts AC power received at the AC inlet 202 into DC power. The DC power generated by the AC/DC conversion circuit 110 is output to the DC connector 203 through the power lines PL2a and PL2b.

Figure 4:
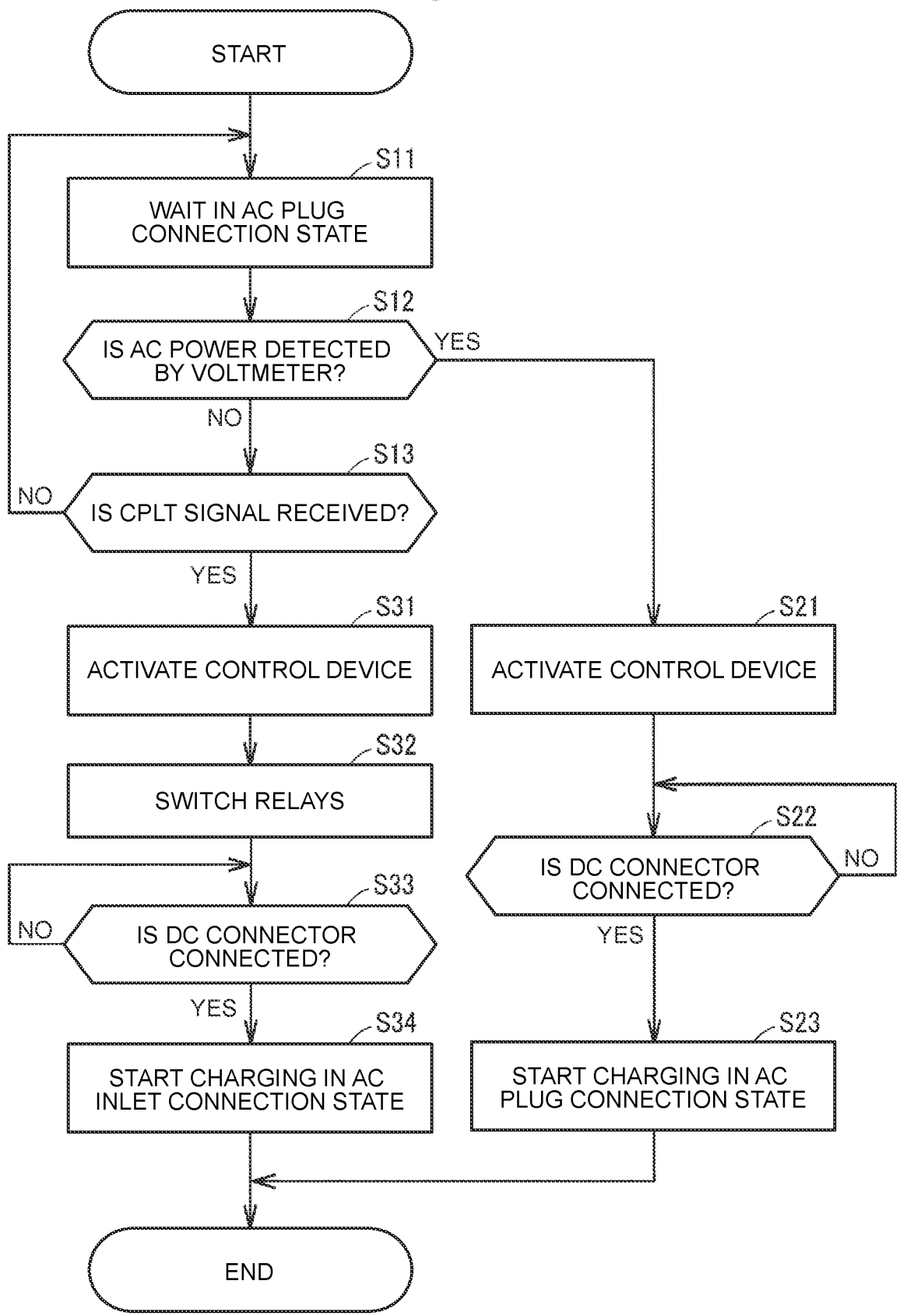
FIG. 4 is a flowchart illustrating a processing procedure when a control device is activated in the charger according to the embodiment of the present disclosure.

FIG. 4 is a flowchart illustrating a processing procedure when the control device 150 is activated in the charger 10A. When the process illustrated in this flowchart is started, the control device 150 is stopped. Therefore, the C-contact relays 121 and 122 are in the AC plug connection state.

Referring to FIG. 4 together with FIG. 1, the charger 10A waits in the AC plug connection state in Step (hereinafter referred to simply as "S") 11. In the AC plug connection state, the first AC port 101A is connected to the AC/DC conversion circuit 110, and the second AC port 102A is not connected to the AC/DC conversion circuit 110. The AC plug connection state corresponds to an example of "first state" according to the present disclosure.

In S12, determination is made whether AC power is input from the AC plug 201 to the first AC port 101A during the waiting. More specifically, the determination result is "YES" in S12 when a signal output from the voltmeter 130 to the control device 150 during the waiting indicates that AC power is input.

When the voltmeter 130 does not detect the input of AC power ("NO" in S12), the process proceeds to S13. In S13, determination is made whether the control device 150 receives a predetermined signal from the AC inlet 202 through the second AC port 102A during the waiting. In this embodiment, the CPLT signal is employed as the predetermined signal. More specifically, the determination result is "YES" in S13 when the control device 150 receives the CPLT signal from the AC inlet 202 during the waiting. As illustrated in FIG. 1, a typical CPLT signal indicates a voltage of 12 V before the AC connector 302a is connected. When the AC connector 302a is connected to the AC inlet 202, the voltage decreases from 12 V to 9 V. When charging is started, the voltage decreases from 9 V to 6 V. When the charging is finished, the voltage increases from 6 V to 9 V. The determination result may be "YES" in S13 when the control device 150 receives the CPLT signal indicating 12 V or 9 V before the start of charging.

When the control device 150 does not receive the CPLT signal ("NO" in S13), the process returns to S11. During a period in which the determination result is "NO" in both S12 and S13, S11 to S13 are repeated and the waiting state is continued.

When the voltmeter 130 detects the input of AC power ("YES" in S12), the control device 150 is activated (S21). In S22, the activated control device 150 determines whether the DC connector 203 is electrically connected to the power storage device 303b. Whether the DC connector 203 is connected may be detected based on a signal transmitted from the vehicle 303 to the control device 150 when the DC connector 203 is connected to the DC inlet 303a. Whether the DC connector 203 is connected may also be detected by a connection sensor (not illustrated) provided on the DC connector 203. When the DC connector 203 is connected to the DC inlet 303a of the vehicle 303, the determination result is "YES" in S22, and the process proceeds to S23. In S23, the control device 150 starts charging the power storage device 303b in the AC plug connection state.

During a period in which the DC connector 203 is not connected to the DC inlet 303a ("NO" in S22), the determination in S22 is repeated. When the DC connector 203 is connected to the DC inlet 303a ("YES" in S22), the control device 150 starts charging the power storage device 303b in S23. During the period in which the DC connector 203 is not connected to the DC inlet 303a ("NO" in S22), the control device 150 may execute a notification process for prompting a user to connect the DC connector 203. For example, the control device 150 may execute the notification process by voice by controlling a loudspeaker (not illustrated), or may turn ON an indicator (not illustrated) provided on the DC connector 203.

When the control device 150 receives the CPLT signal ("YES" in S13), the control device 150 is activated (S31). In S32, the activated control device 150 controls the switching device 120 to switch the AC plug connection to the AC inlet connection. In the AC inlet connection state, the second AC port 102A is connected to the AC/DC conversion circuit 110, and the first AC port 101A is not connected to the AC/DC conversion circuit 110. The AC inlet connection state corresponds to an example of "second state" according to the present disclosure.

After the process of S32, the control device 150 determines in S33 whether the DC connector 203 is electrically connected to the power storage device 303b. When the DC connector 203 is connected to the DC inlet 303a of the vehicle 303, the determination result is "YES" in S33, and the process proceeds to S34. In S34, the control device 150 starts charging the power storage device 303b in the AC inlet connection state. When the determination result is "NO" in S33, the process is identical to the process executed when the determination result is "NO" in S22. Therefore, description of the process is omitted.

When the charging is started through the process of S23 or S34, the series of processes illustrated in FIG. 4 is terminated. Details of charging control are omitted. The power storage device 303b is charged by converting AC power supplied from the AC plug 201 or the AC inlet 202 into DC power by the AC/DC conversion circuit 110 and outputting the DC power from the DC connector 203. The control device 150 controls output electric power of the DC connector 203 (furthermore, electric power for charging the power storage device 303b) by controlling the AC/DC conversion circuit 110. When charging the power storage device 303b with AC power supplied from the AC plug 201, the control device 150 may control the charging electric power in response to a request from the vehicle 303. When charging the power storage device 303b with AC power supplied from the AC inlet 202, the control device 150 may control the charging electric power based on the CPLT signal and a request from the vehicle 303 (for example, a value of a parameter Win for limiting the charging electric power). The power storage device 303b is continuously charged until a predetermined termination condition is satisfied. When the termination condition is satisfied, the charging is stopped. For example, the termination condition may be satisfied when the power storage device 303b is fully charged. The termination condition may be satisfied when the EVSE 301 or 302 and the vehicle 303 are disconnected during the charging. The termination condition may be satisfied when an abnormality occurs in the vehicle 303, the EVSE 301, or the EVSE 302 during the charging.

As described above, the charger 10A according to this embodiment includes the casing 100A and the AC/DC conversion circuit 110 provided in the casing 100A. The casing 100A includes the first AC port 101A, the second AC port 102A, and the DC port 103A. DC power is output through the DC port 103A to the DC connector 203 configured to electrically connect the charger 10A to the power storage device 303b. AC power for charging the power storage device 303b is input to each of the first AC port 101A and the second AC port 102A. AC power received at the AC plug 201 connectable to the AC socket 301a is input to the first AC port 101A. AC power received at the AC inlet 202 connectable to the AC connector 302a is input to the second AC port 102A. The charger 10A further includes the switching device 120 in the casing 100A to connect the first AC port 101A or the second AC port 102A selectively to the AC/DC conversion circuit 110. The AC/DC conversion circuit 110 converts, into DC power, the AC power input from the AC port connected by the switching device 120, and outputs the DC power to the DC port 103A.

In the charger 10A, when the first AC port 101A is connected to the AC/DC conversion circuit 110, the AC/DC conversion circuit 110 converts the AC power received at the AC plug 201 into the DC power. When the second AC port 102A is connected to the AC/DC conversion circuit 110, the AC/DC conversion circuit 110 converts the AC power received at the AC inlet 202 into the DC power. The DC power generated by the AC/DC conversion circuit 110 is output to the DC connector 203. The charger 10A can receive the AC power supplied both from the AC socket 301a and from the AC connector 302a, convert the supplied AC power into the DC power, and output the DC power to the DC connector 203.

The charger 10A includes the control device 150 in the casing 100A to control the switching device 120. When AC power is input from the AC plug 201 to the first AC port 101A ("YES" in S12 of FIG. 4), the control device 150 brings the switching device 120 into the AC plug connection state. When AC power is input from the AC inlet 202 to the second AC port 102A ("YES" in S13 of FIG. 4), the control device 150 brings the switching device 120 into the AC inlet connection state. In the embodiment described above, the charger 10A includes the sensor (voltmeter 130) in the casing 100A to detect the AC power input from the AC plug 201 to the first AC port 101A. The control device 150 waits in the AC plug connection state (S11 of FIG. 4). When the voltmeter 130 detects the AC power input from the AC plug 201 to the first AC port 101A during the waiting ("YES" in S12 of FIG. 4) and the charger 10A is electrically connected to the power storage device 303b through the DC connector 203 ("YES" in S22 of FIG. 4), the control device 150 starts charging the power storage device 303b in the AC plug connection state (S23 of FIG. 4). When the control device 150 receives the predetermined signal (for example, the CPLT signal) from the AC inlet 202 through the second AC port 102A during the waiting ("YES" in S13 of FIG. 4), the control device 150 controls the switching device 120 into the AC inlet connection state (S32 of FIG. 4). When the charger 10A is electrically connected to the power storage device 303b through the DC connector 203 ("YES" in S33 of FIG. 4), the control device 150 starts charging the power storage device 303b in the AC inlet connection state (S34 of FIG. 4). According to this structure, the charging of the power storage device 303b is started in an appropriate state depending on the AC port (first AC port 101A or second AC port 102A) to which the AC power is input.

Figure 5:
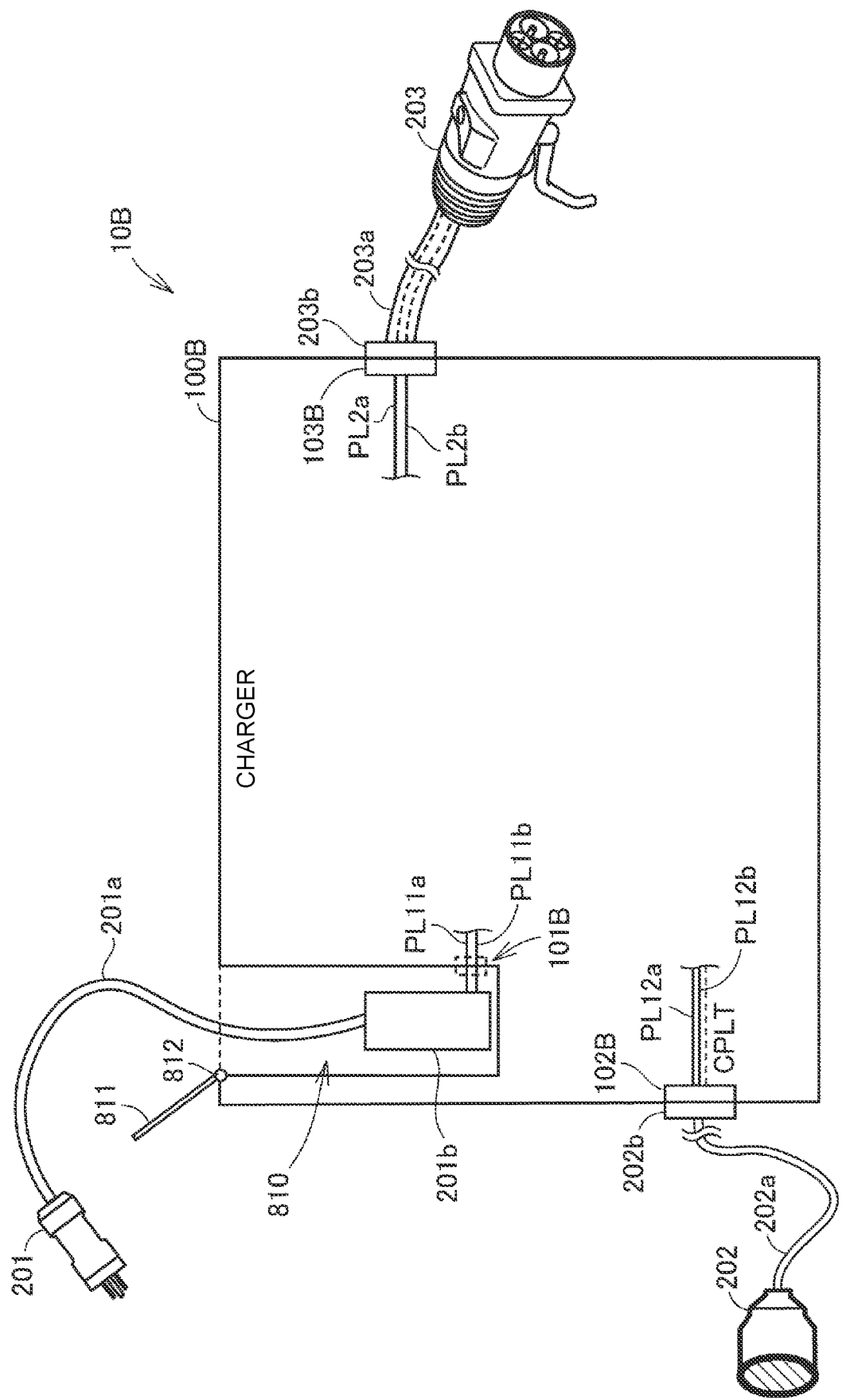
FIG. 5 is a diagram illustrating a casing having a cable housing portion in a charger according to a modified example.

The casing of the charger may have a housing portion configured to house the cable 201a of the AC plug 201 (cable housing portion). The DC port may be a connector configured to removably attach the DC connector 203 to the charger. The second AC port may be a connector configured to removably attach the AC inlet 202 to the charger. FIG. 5 is a diagram illustrating an example of the casing having the cable housing portion. In FIG. 5, the AC/DC conversion circuit 110, the switching device 120, the voltmeter 130, and the control device 150 are omitted in the casing, but the circuit having the structure illustrated in FIG. 1 is provided in the casing of this example as well.

Referring to FIG. 5, a casing 100B of a charger 10B has a housing portion 810 configured to house the cable 201a of the AC plug 201. The casing 100B has a lid 811 configured to open or close the housing portion 810. The lid 811 is coupled to the casing 100B via an opening/closing mechanism 812 (for example, a hinge) to open or close the housing portion 810 in the casing 100B. The charger 10B includes a winding device 201b configured to wind up, in the housing portion 810, the cable 201a of the AC plug 201 that is located outside the housing portion 810.

The winding device 201b includes a cable reel and an actuator (both are not illustrated). The cable 201a can be wound around the cable reel. The actuator winds up, around the cable reel, the cable 201a of the AC plug 201 that is located outside the housing portion 810. The winding device 201b may be a mechanical automatic winding device (for example, a spring type cable reel). In the spring type cable reel, a spiral spring is tightened when the cable is pulled out, and the cable is wound up by using a repulsive force of the spiral spring. The spiral spring functions as the actuator.

The power lines PL11a and PL11b are connected, through the first AC port 101B (wiring hole), to the cable 201a wound around the cable reel of the winding device 201b. The power lines PL11a and PL11b are connected to the AC plug 201 through the cable 201a.

A second AC port 102B is a connector configured to removably attach the AC inlet 202 to the charger 10B. A connector 202b is provided at the distal end of the cable 202a connected to the AC inlet 202. The connector 202b connected to the AC inlet 202 is connected to the second AC port 102B.

A DC port 103B is a connector configured to removably attach the DC connector 203 to the charger 10B. A connector 203b is provided at the distal end of the cable 203a connected to the DC connector 203. The connector 203b connected to the DC connector 203 is connected to the DC port 103B.

Figure 6:
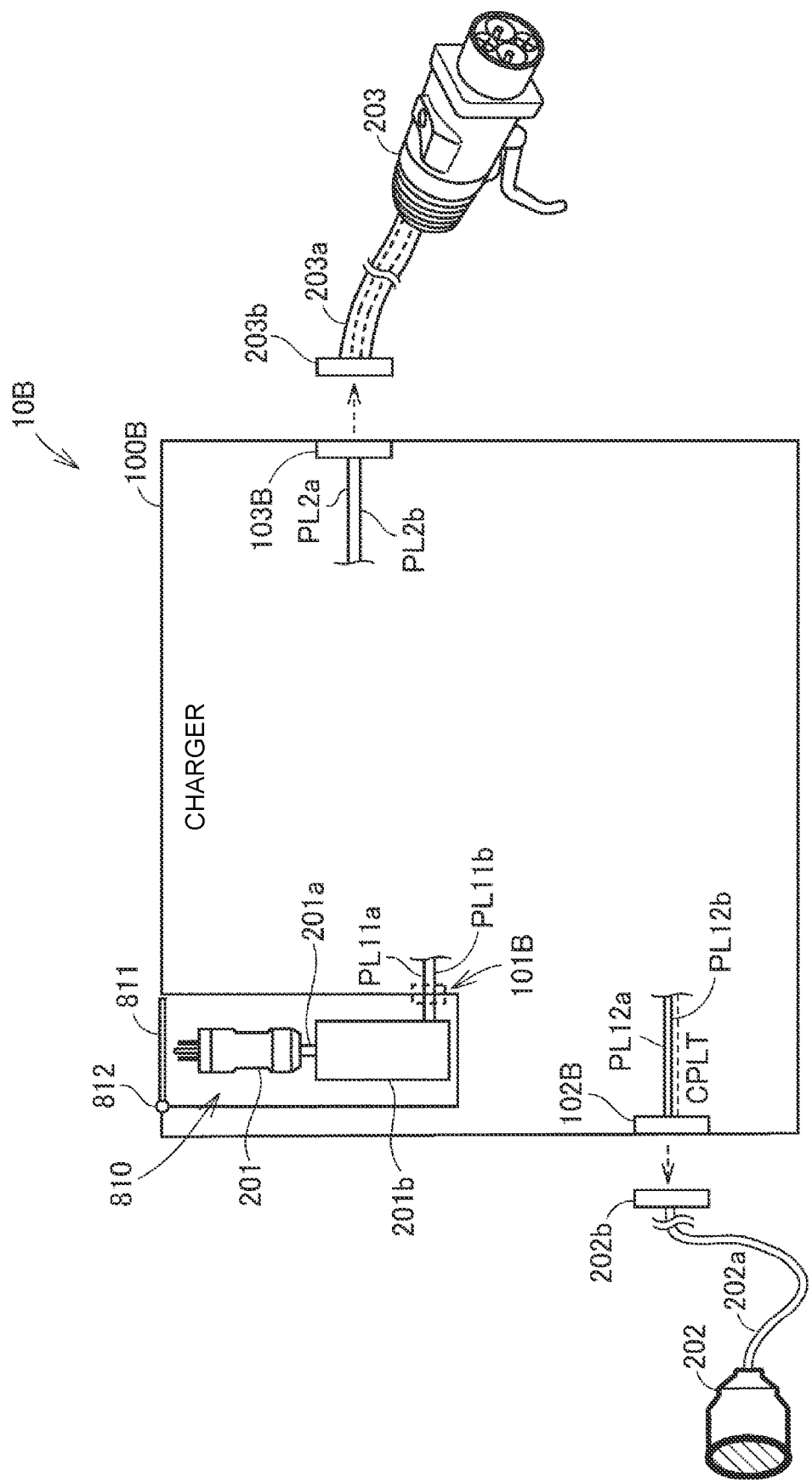
FIG. 6 is a diagram illustrating an example of how the charger illustrated in FIG. 5 is stored.

The charger 10B may be stored in a manner illustrated in FIG. 6 after use. FIG. 6 is a diagram illustrating an example of how the charger 10B illustrated in FIG. 5 is stored. Referring to FIG. 6, the cable 201a of the AC plug 201 may be wound up in the housing portion 810 by the winding device 201b, and the lid 811 may be closed. In this manner, the AC plug 201 and the cable 201a are housed in the housing portion 810. The connector 202b connected to the AC inlet 202 may be removed from the second AC port 102B. The connector 203b connected to the DC connector 203 may be removed from the DC port 103B. The charger 10B is easy to carry in the state illustrated in FIG. 6.

Figure 7:
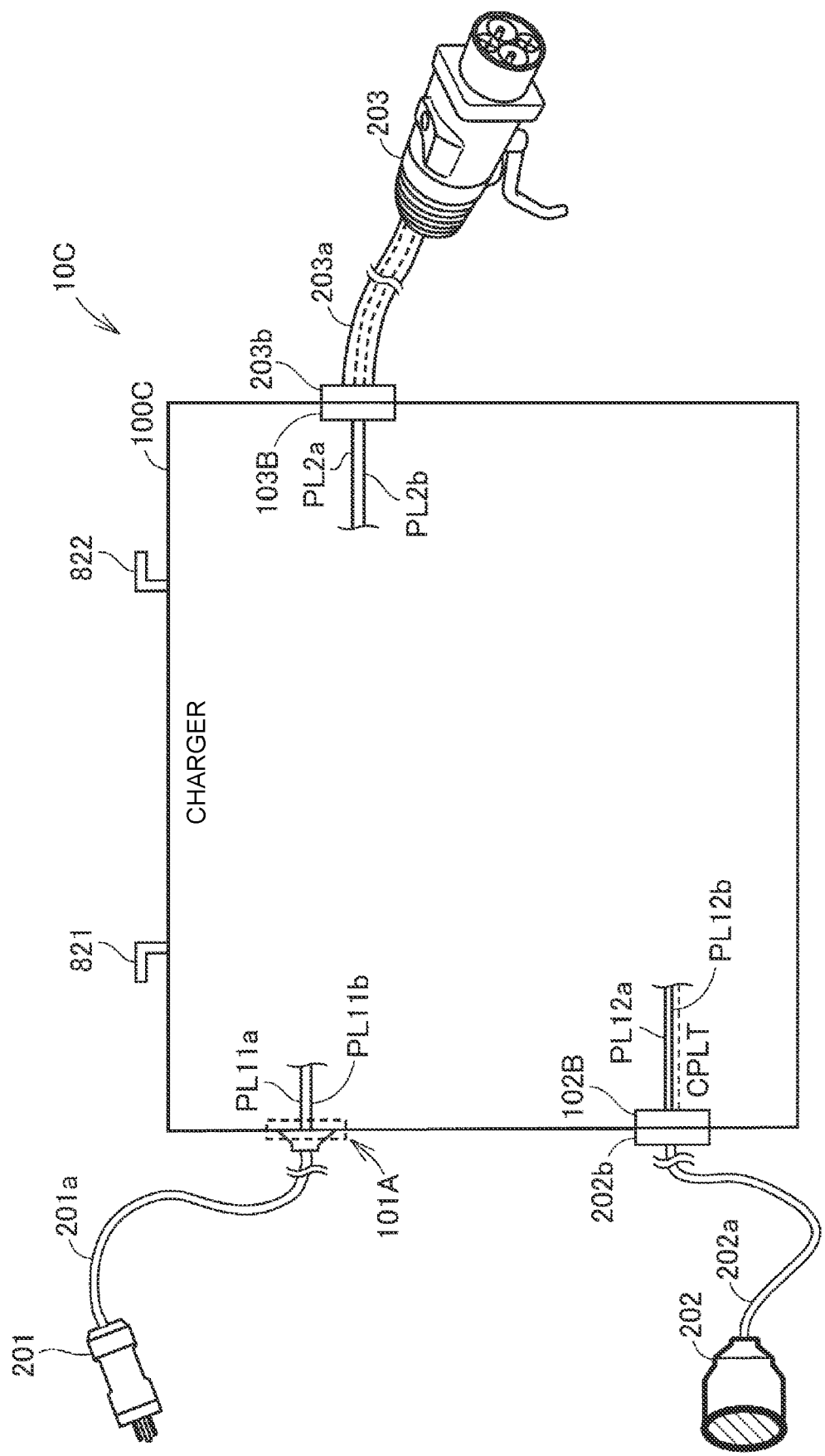
FIG. 7 is a diagram illustrating a modified example of the casing illustrated in FIG. 5.

In place of or in addition to the housing portion 810, the casing of the charger may have a cable keeper where the cable 201a of the AC plug 201 can be wound. FIG. 7 is a diagram illustrating a modified example of the casing illustrated in FIG. 5. Referring to FIG. 7, a casing 100C of a charger 10C has cable keepers 821 and 822 (for example, hooks) in place of the housing portion 810 (FIG. 5). The cable keepers 821 and 822 are fixed to an outer wall of the casing 100C. The cable 201a of the AC plug 201 can be held on the outer wall of the casing 100C by winding the cable 201a of the AC plug 201 around the cable keepers 821 and 822.

Each of the chargers 10B and 10C may be connectable to a plurality of types of DC connectors different in standards (for example, DC connectors conforming to CHAdeMO, Combined Charging System (CCS), GB/T, and Tesla) through the DC port 103B (connector). Each of the chargers 10B and 10C may be connectable to a plurality of types of AC inlets different in standards (for example, AC inlets conforming to Type 1 (single-phase/three-phase), Type 2 (single-phase/three-phase), and GB/T) through the second AC port 102B (connector).

The first AC port of any one of the chargers 10A to 10C may be a connector configured to removably attach the AC plug 201 to the charger. The charger may be connectable to a plurality of types of AC plugs different in standards through the first AC port (connector).

Figure 8:
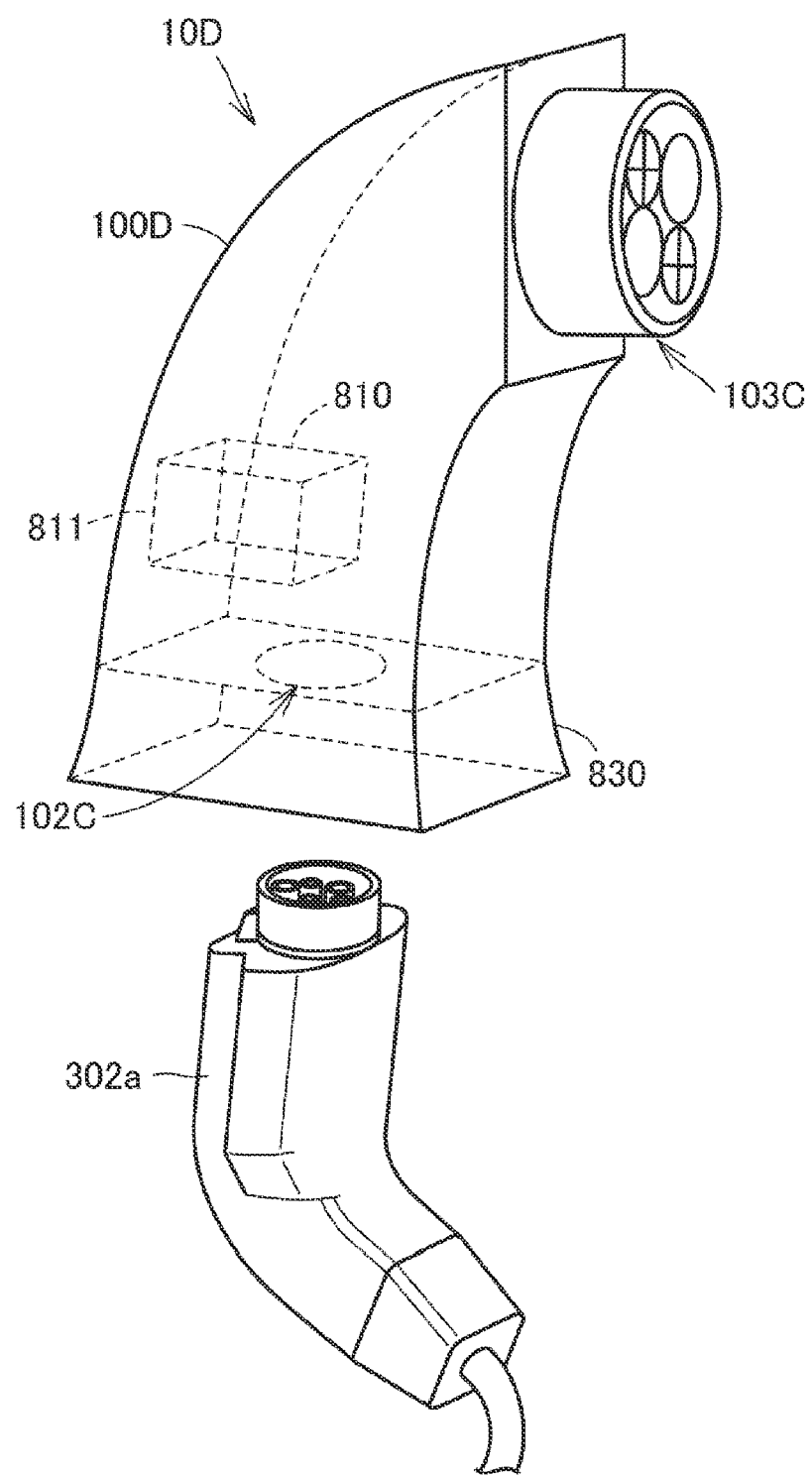
FIG. 8 is a diagram illustrating a charger having an AC inlet and a DC connector at a second AC port and a DC port, respectively, according to a modified example.

The AC inlet and the DC connector may be provided to the second AC port and the DC port, respectively. FIG. 8 is a diagram illustrating an example in which the AC inlet and the DC connector are provided to the second AC port and the DC port, respectively. Although FIG. 8 does not illustrate the AC plug 201 and the cable 201a, the AC plug 201 and the cable 201a are, for example, housed in the housing portion 810 in the state illustrated in FIG. 6. Also in this example, the circuit having the structure illustrated in FIG. 1 is provided in the casing.

Referring to FIG. 8, a charger 10D includes a casing 100D. A second AC port 102C and a DC port 103C of the casing 100D function as the AC inlet and the DC connector, respectively. That is, in the charger 10D, the second AC port 102C and the AC inlet are integrated together, and the DC port 103C and the DC connector are integrated together. The second AC port 102C is connectable to the AC connector 302a of the EVSE 302 (see FIG. 1). The DC port 103C is connectable to the DC inlet 303a of the vehicle 303 (see FIG. 1).

The casing 100D has a skirt 830 projecting around the second AC port 102C. The second AC port 102C is surrounded by the skirt 830. The skirt 830 acts to protect the second AC port 102C from, for example, rain, snow, and wind (furthermore, foreign objects blown by wind).

Figure 9:
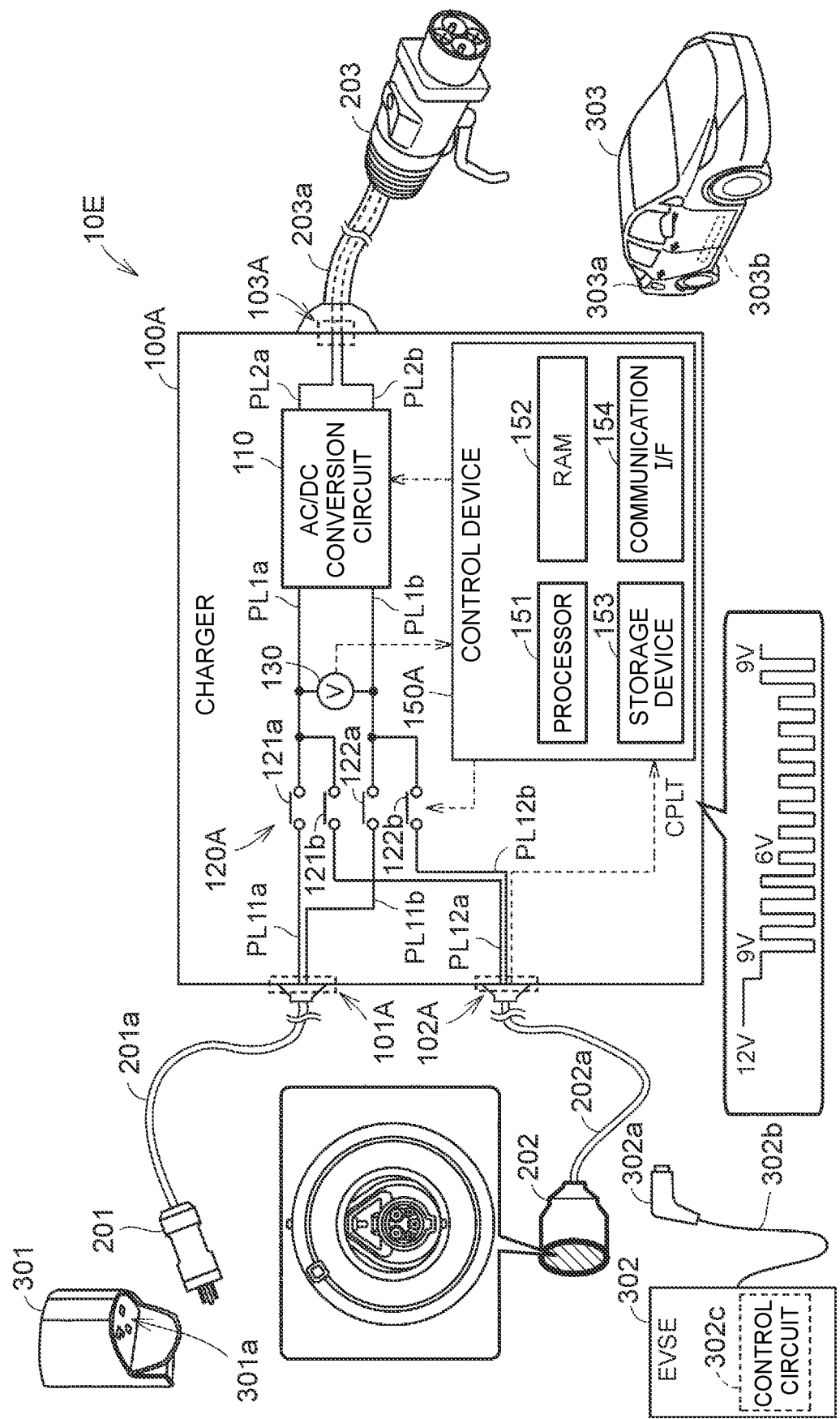
FIG. 9 is a diagram illustrating a modified example of a switching device illustrated in FIG. 1.

In the embodiment described above, the C-contact relay 121 and the C-contact relay 122 are provided at the first branch point and the second branch point, respectively. The present disclosure is not limited to this case. A-contact relays may be employed in place of the C-contact relays. FIG. 9 is a diagram illustrating a modified example of the switching device 120 illustrated in FIG. 1.

Referring to FIG. 9, a charger 10E includes a switching device 120A in the casing 100A. The switching device 120A includes A-contact relays 121a, 122a, 121b, and 122b provided for the respective power lines. The A-contact relays 121a, 122a, 121b, and 122b are arranged on the power lines PL11a, PL11b, PL12a, and PL12b, respectively. The A-contact relays 121a, 122a, 121b, and 122b are controlled by a control device 150A. The control device 150A can bring the switching device 120A into the AC plug connection state by connecting (closing) the A-contact relays 121a and 122a and disconnecting (opening) the A-contact relays 121b and 122b. The control device 150A can bring the switching device 120A into the AC inlet connection state by disconnecting (opening) the A-contact relays 121a and 122a and connecting (closing) the A-contact relays 121b and 122b.

The number of AC ports of the charger is not limited to two, and may be three or more. The power lines may be branched depending on the number of AC ports, and the A-contact relays (see FIG. 9) may be provided for the respective branched power lines.

Figure 10:
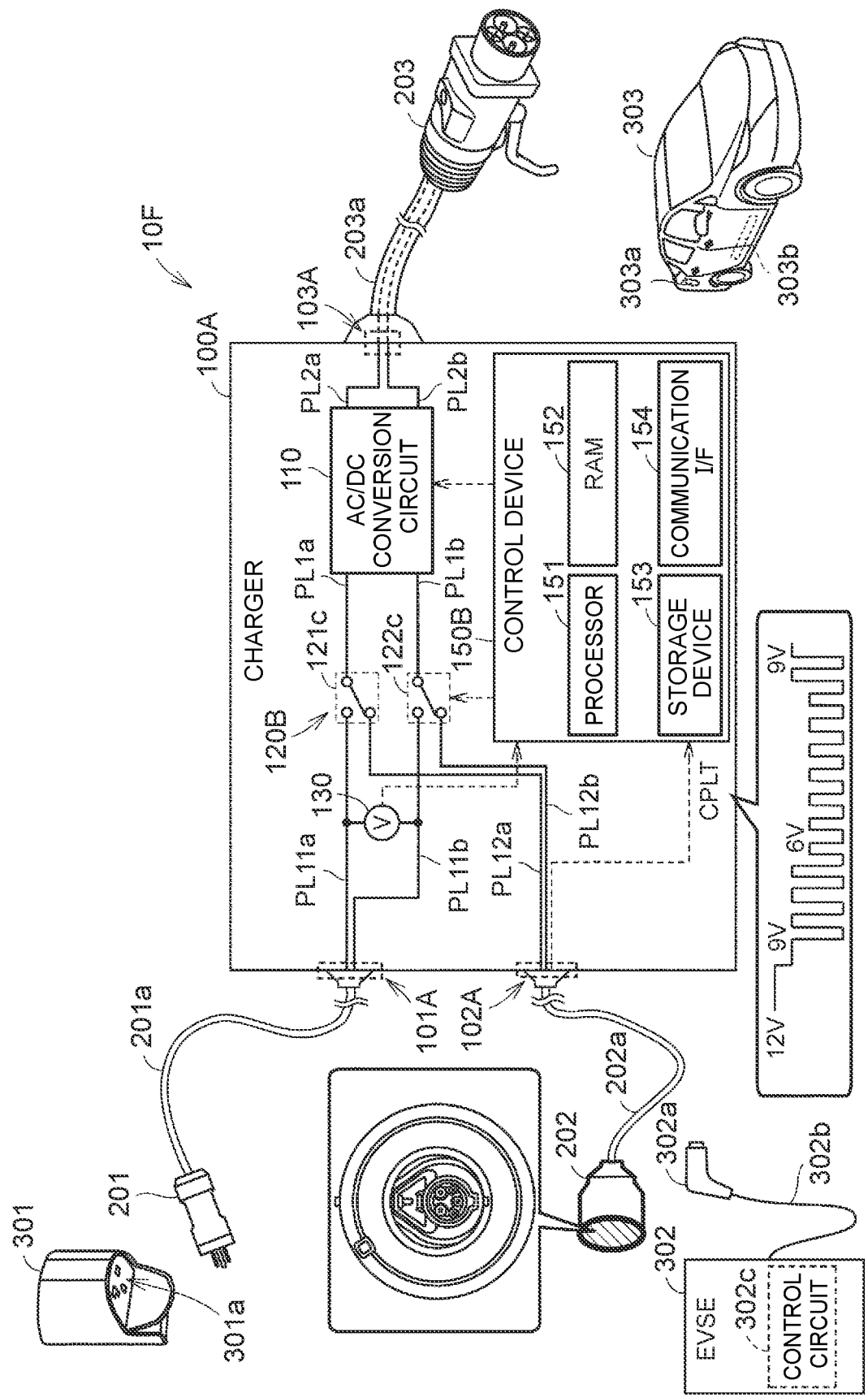
FIG. 10 is a diagram illustrating a modified example of a circuit structure in the casing illustrated in FIG. 1.

The circuit structure in the casing of the charger is not limited to the circuit structure illustrated in FIG. 1. In the embodiment described above, the voltmeter 130 may detect a voltage between the power line PL11a and the power line PL11b. The switching device 120 may come into the AC inlet connection state while no instruction is given from the control device 150 (for example, in the non-energized state). FIG. 10 is a diagram illustrating a modified example of the circuit structure illustrated in FIG. 1.

Referring to FIG. 10, a charger 10F includes a switching device 120B in the casing 100A. The switching device 120B includes a C-contact relay 121c and a C-contact relay 122c. The C-contact relays 121c and 122c are controlled by a control device 150B. While no instruction is given from the control device 150B (for example, in the non-energized state), the C-contact relays 121c and 122c are in the AC inlet connection state. In the AC inlet connection, the power lines PL12a and PL12b are connected to the power lines PL1a and PL1b, respectively.

The voltmeter 130 detects a voltage between the power line PL11a and the power line PL11b. A detection result from the voltmeter 130 is output to the control device 150B.

Figure 11:
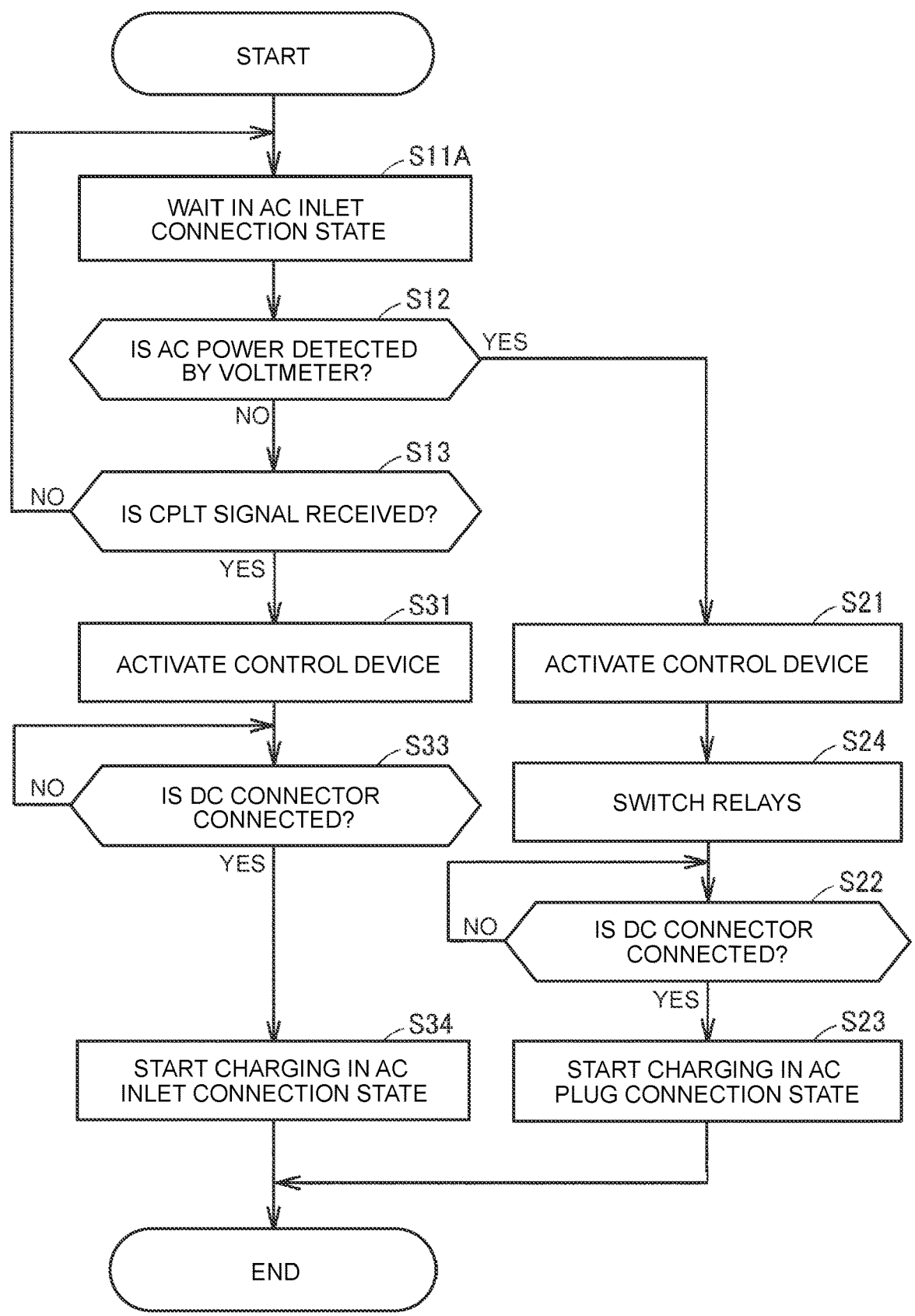
FIG. 11 is a flowchart illustrating a modified example of the process illustrated in FIG. 4.

FIG. 11 is a flowchart illustrating a modified example of the process illustrated in FIG. 4. When the process illustrated in this flowchart is started, the control device 150B is stopped. The control device 150B is activated by executing the process illustrated in FIG. 11. In the process illustrated in FIG. 11, S24 is added to and S32 (FIG. 4) is omitted from the process illustrated in FIG. 4. Further, S11A is employed in place of S11 (FIG. 4). S11A and S24 are described below.

Referring to FIG. 11 together with FIG. 10, the charger 10F waits in the AC inlet connection state in S11A. In the AC inlet connection state, the second AC port 102A is connected to the AC/DC conversion circuit 110, and the first AC port 101A is not connected to the AC/DC conversion circuit 110.

S24 is provided between S21 and S22. When the voltmeter 130 detects an input of AC power ("YES" in S12), the control device 150B is activated (S21). In S24, the activated control device 150B controls the switching device 120B to switch the AC inlet connection to the AC plug connection. In the AC plug connection state, the first AC port 101A is connected to the AC/DC conversion circuit 110, and the second AC port 102A is not connected to the AC/DC conversion circuit 110. In S23, the control device 150B starts charging the power storage device 303b in the AC plug connection state.

When the control device 150B receives the CPLT signal ("YES" in S13), the switching device 120B does not switch connection. In S34, the control device 150B starts charging the power storage device 303b in the AC inlet connection state.

Also in the charger 10F according to this modified example, the charging of the power storage device 303b is started in an appropriate state depending on the AC port (first AC port 101A or second AC port 102A) to which the AC power is input.

The vehicle including the power storage device is not limited to the electric vehicle (EV), and may be, for example, a plug-in hybrid vehicle (PHV). The power storage device to which the charger is applied may be mounted on a riding machine other than the vehicle (such as a ship or an aircraft), mounted on an unattended moving object (such as an automated guided vehicle (AGV), agricultural equipment, a movable robot, or a drone), mounted on a mobile device (such as a smartphone or a wearable device), or installed in a building (such as a house or a factory).

The relay of the present disclosure may be a first relay provided on a power path at a first polarity, and a second relay paired with the first relay may be provided on a power path at a second polarity opposite to the first polarity.

In the charger of the present disclosure, the second power line passes through the DC port (for example, a wiring hole)

provided on the casing. The third power line passes through the first AC port (for example, a wiring hole) provided on the casing. The fourth power line passes through the second AC port (for example, a wiring hole) provided on the casing. According to the structure described above, the second power line, the third power line, and the fourth power line can seamlessly connect the power conversion circuit to the DC connector, the relay to the AC plug, and the relay to the AC inlet, respectively. The casing may have a housing portion configured to house a cable of the AC plug (third power line). The charger may include a device configured to wind up, in the housing portion, the cable of the AC plug that is located outside the housing portion.

The charger of the present disclosure may be connectable to a plurality of types of DC connectors different in standards through the DC port. The charger may be connectable to a plurality of types of AC inlets different in standards through the second AC port.

The first AC port of the present disclosure may be a connector configured to removably attach the AC plug to the charger. The charger may be connectable to a plurality of types of AC plugs different in standards through the first AC port.

Each of the DC port, the first AC port, and the second AC port of the present disclosure is not limited to the wiring hole and the connector described above. For example, the AC inlet may be provided to the second AC port, and the second AC port and the AC inlet may be integrated together.

It should be understood that the embodiment disclosed herein is illustrative but is not limitative in all respects. The scope of the present disclosure is defined by the claims rather than the description of the embodiment above, and is intended to encompass meanings of equivalents to the elements in the claims and all modifications within the scope of the claims.

What is claimed is:

1. A charger comprising:
    a casing, the casing including
        a DC port configured to be a port through which direct current electric power is output to a DC connector, the DC connector being configured to electrically connect the charger to a power storage device, and
        a plurality of AC ports configured to be ports to which alternating current electric power for charging the power storage device is input;
    a power conversion circuit, the power conversion circuit being provided in the casing; and
    a switching device, the switching device being provided in the casing, and configured to connect only one of the AC ports selectively to the power conversion circuit, wherein:
    the power conversion circuit is configured to convert, into direct current electric power, alternating current electric power input from the AC port connected by the switching device, and output the direct current electric power to the DC port; and
    the AC ports include
        a first AC port configured to be a port to which alternating current electric power received at an AC plug connectable to an AC power socket is input, and
        a second AC port configured to be a port to which alternating current electric power received at an AC inlet connectable to a connector of an AC power cable is input.

2. The charger according to claim 1, wherein:
    the power conversion circuit is connected to a first power line and a second power line;
    the second power line is connected to the DC port;
    the first power line branches, inside the casing, into a third power line connected to the first AC port and a fourth power line connected to the second AC port; and
    the switching device includes a relay configured to selectively connect the third power line or the fourth power line to the power conversion circuit.

3. The charger according to claim 2, wherein:
    the second power line is connected to the DC connector outside the casing from the power conversion circuit in the casing through the DC port;
    the third power line is connected to the AC plug outside the casing from the relay in the casing through the first AC port; and
    the fourth power line is connected to the AC inlet outside the casing from the relay in the casing through the second AC port.

4. The charger according to claim 1, wherein:
    the DC port is a connector configured to removably attach the DC connector to the charger; and
    the second AC port is a connector configured to removably attach the AC inlet to the charger.

5. The charger according to claim 1, wherein:
    the DC connector is configured to be connected to a DC power inlet of a vehicle including the power storage device;
    the AC power socket is a socket of first electric vehicle supply equipment;
    the AC power cable is a cable of second electric vehicle supply equipment; and
    the charger is a portable charger loadable onto and unloadable from the vehicle.

6. The charger according to claim 1, further comprising a processor, the processor being provided in the casing, and configured to control the switching device, wherein the processor is configured to:
    connect the first AC port to the power conversion circuit and disconnect the second AC port from the power conversion circuit when alternating current electric power is input from the AC plug to the first AC port; and
    connect the second AC port to the power conversion circuit and disconnect the first AC port from the power conversion circuit when alternating current electric power is input from the AC inlet to the second AC port.

7. The charger according to claim 6, further comprising a sensor, the sensor being provided in the casing, and configured to detect alternating current electric power input from the AC plug to the first AC port, wherein the processor is configured to:
    in a first state in which the first AC port is connected to the power conversion circuit and the second AC port is disconnected from the power conversion circuit, start charging the power storage device in the first state when the sensor detects alternating current electric power input from the AC plug to the first AC port and the charger is electrically connected to the power storage device through the DC connector; and
    when a predetermined signal is received from the AC inlet through the second AC port in the first state, control the switching device to switch over to a second state in which the second AC port is connected to the power conversion circuit and the first AC port is disconnected from the power conversion circuit, and start charging the power storage device in the second state when the charger is electrically connected to the power storage device through the DC connector.

8. The charger according to claim 7, wherein the predetermined signal is a control pilot signal.

\* \* \* \* \*